May 4, 1965
A. S. PARKS
3,181,286
APPARATUS FOR RECOVERING HYDROCARBONS
AND LIQUIDS FROM GAS STREAMS
Filed Nov. 5, 1958
6 Sheets-Sheet 6
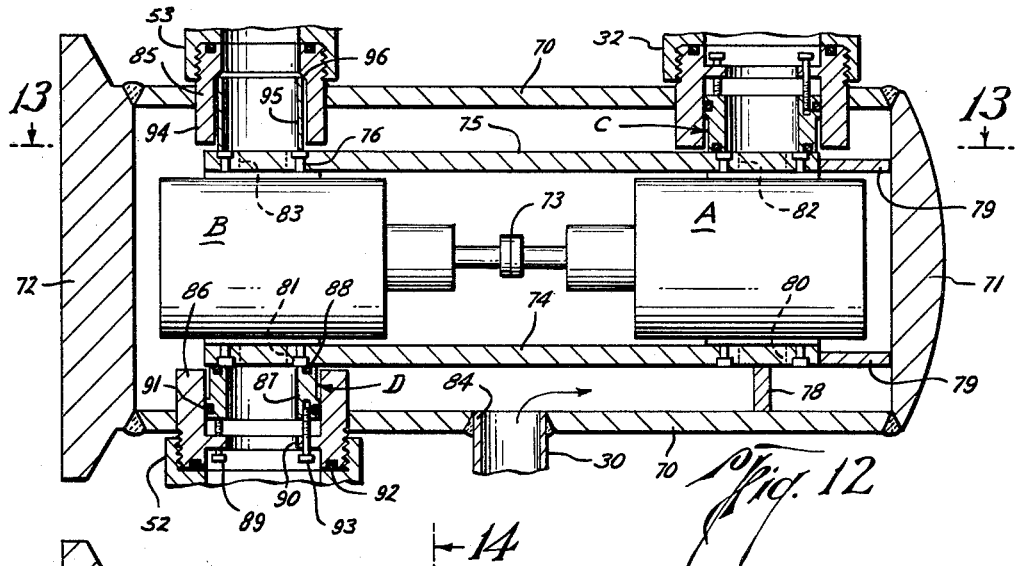
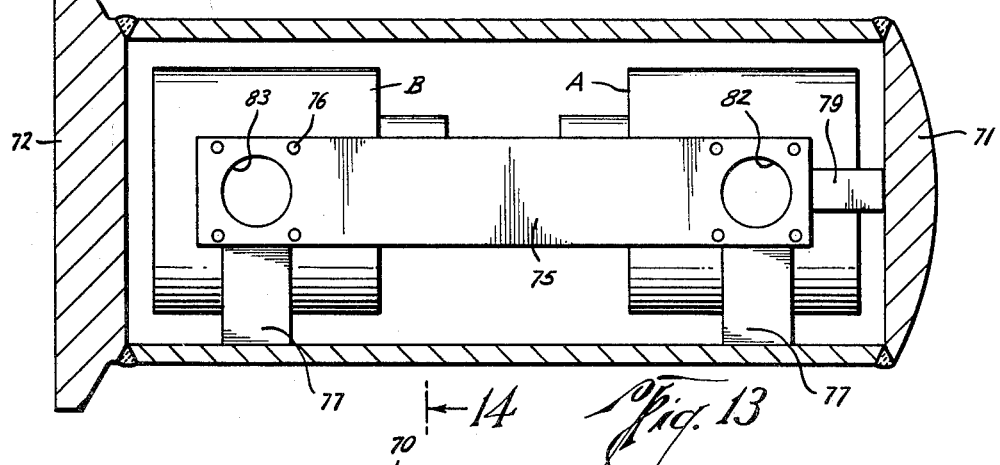
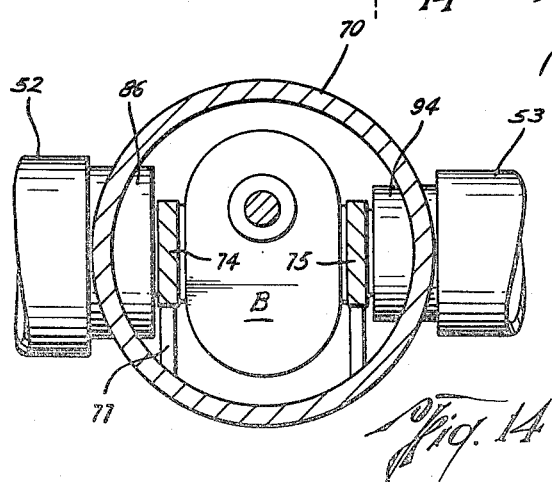
Asbury S. Parks
INVENTOR.
BY
ATTORNEYS

# United States Patent Office 3,181,286
Patented May 4, 1965

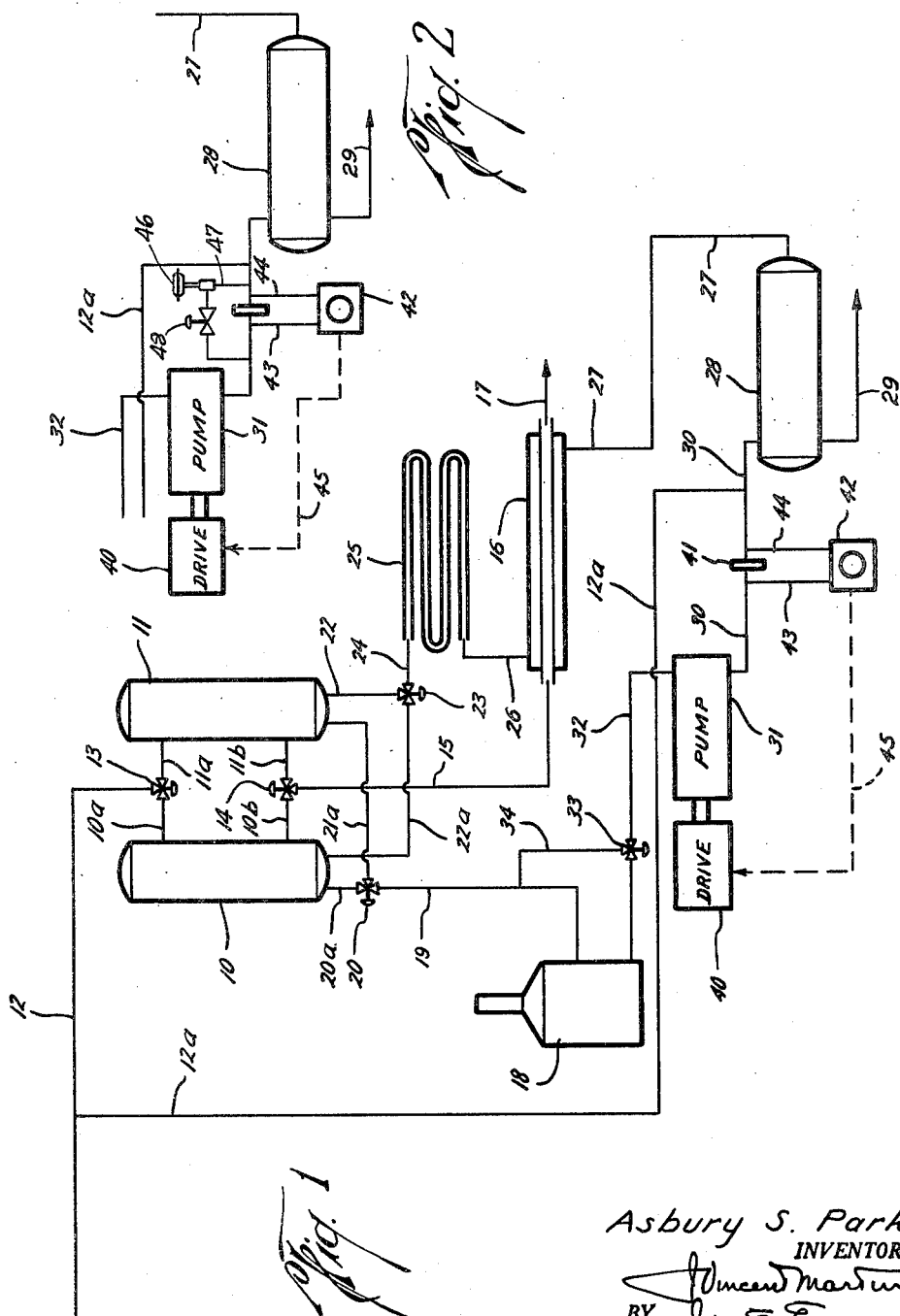

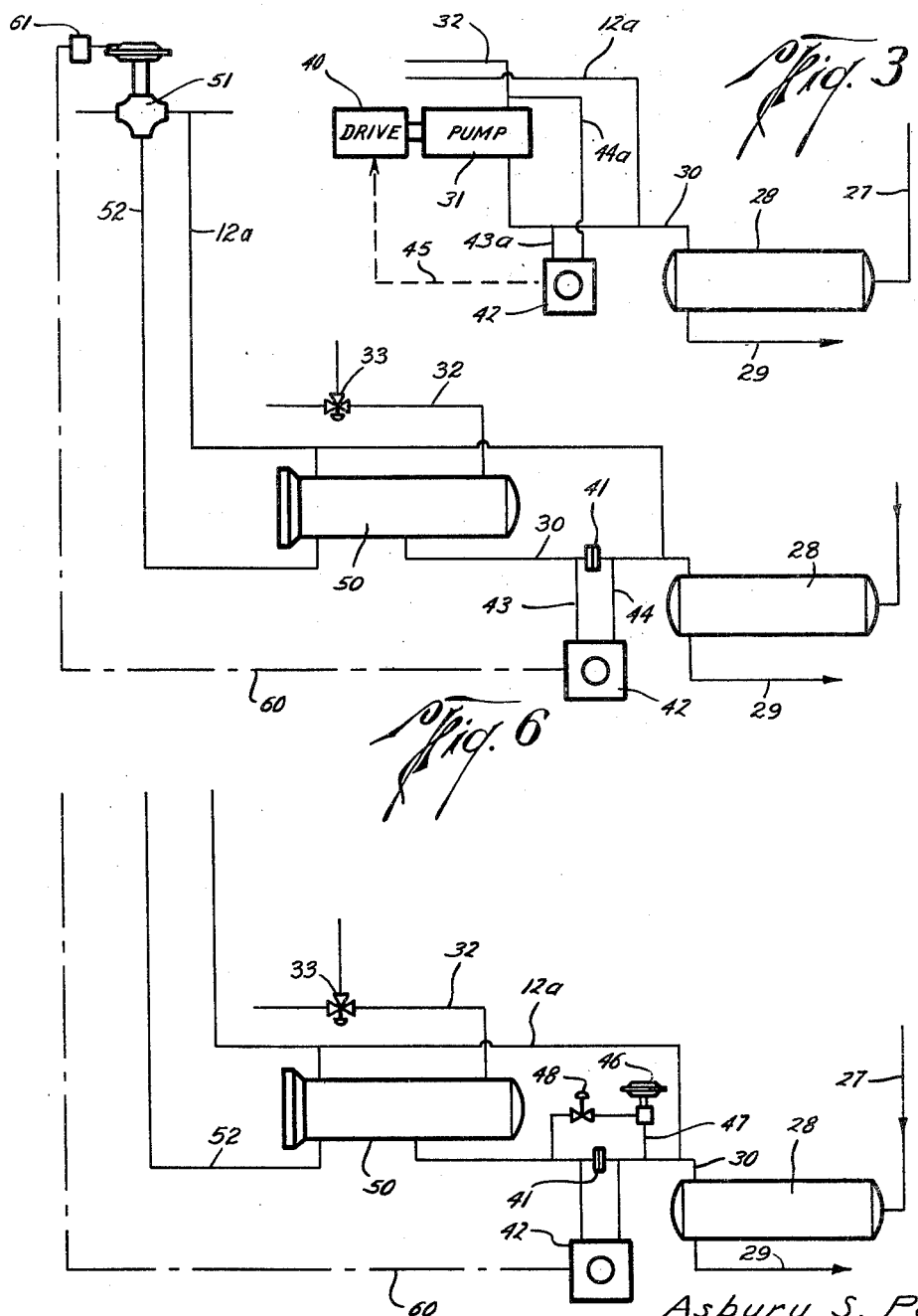

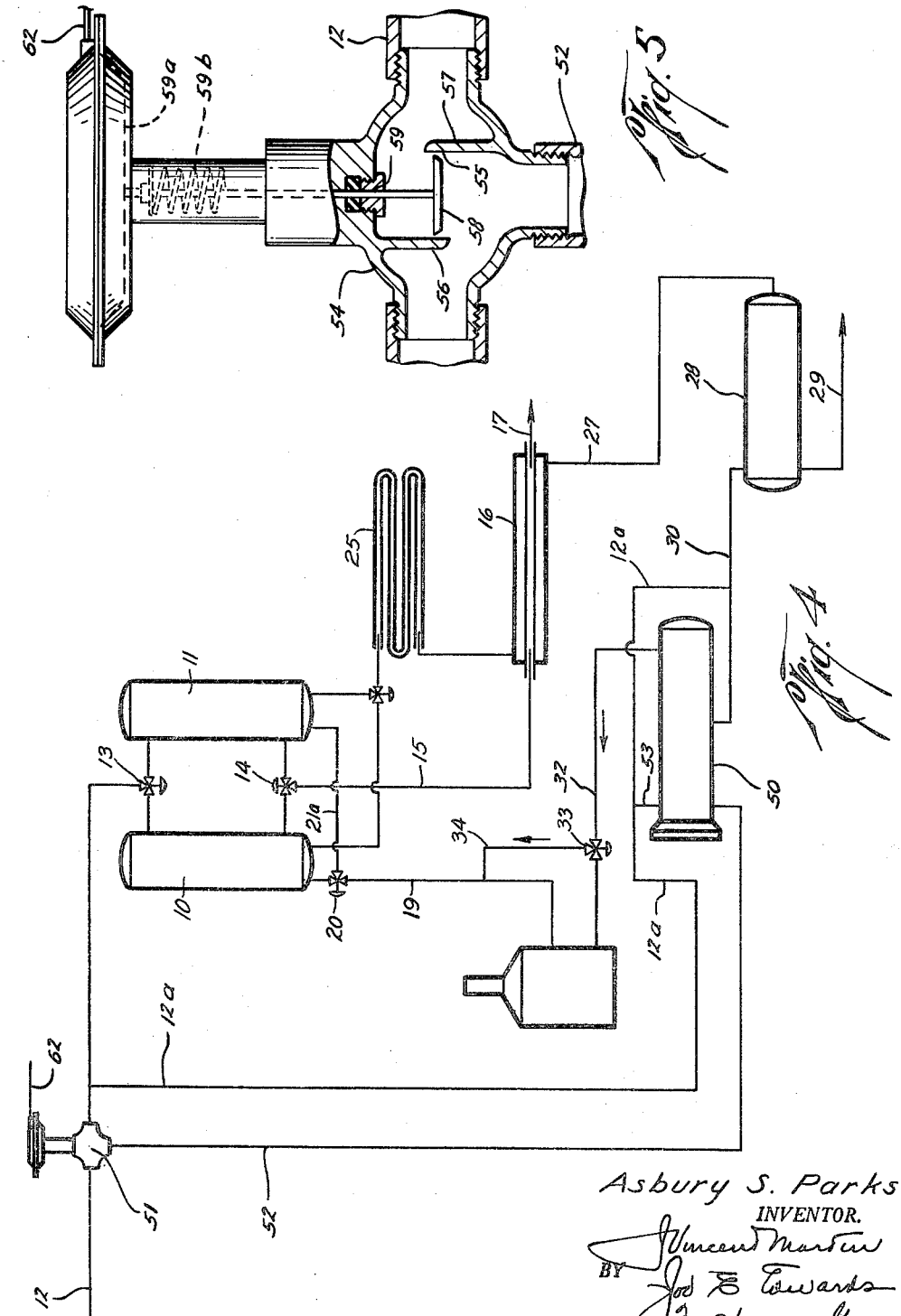

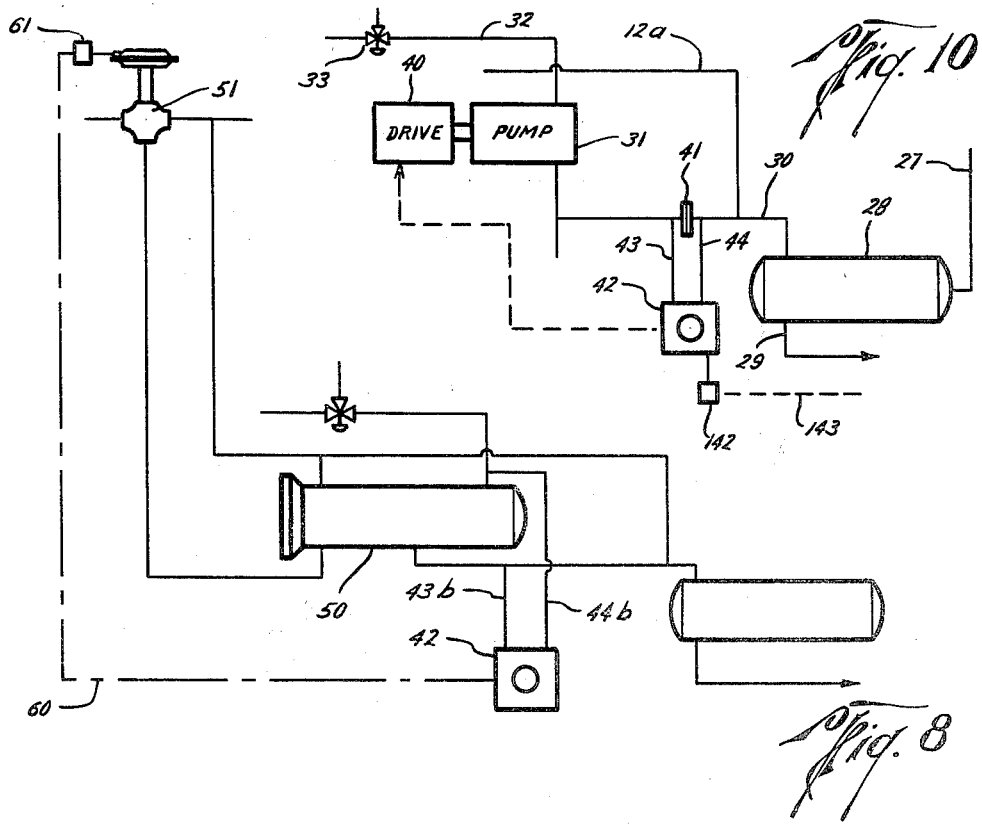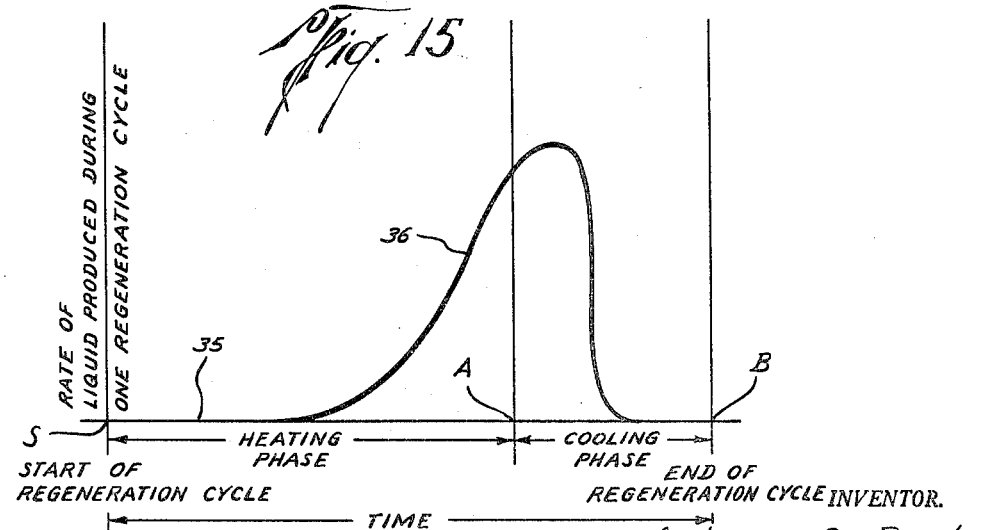

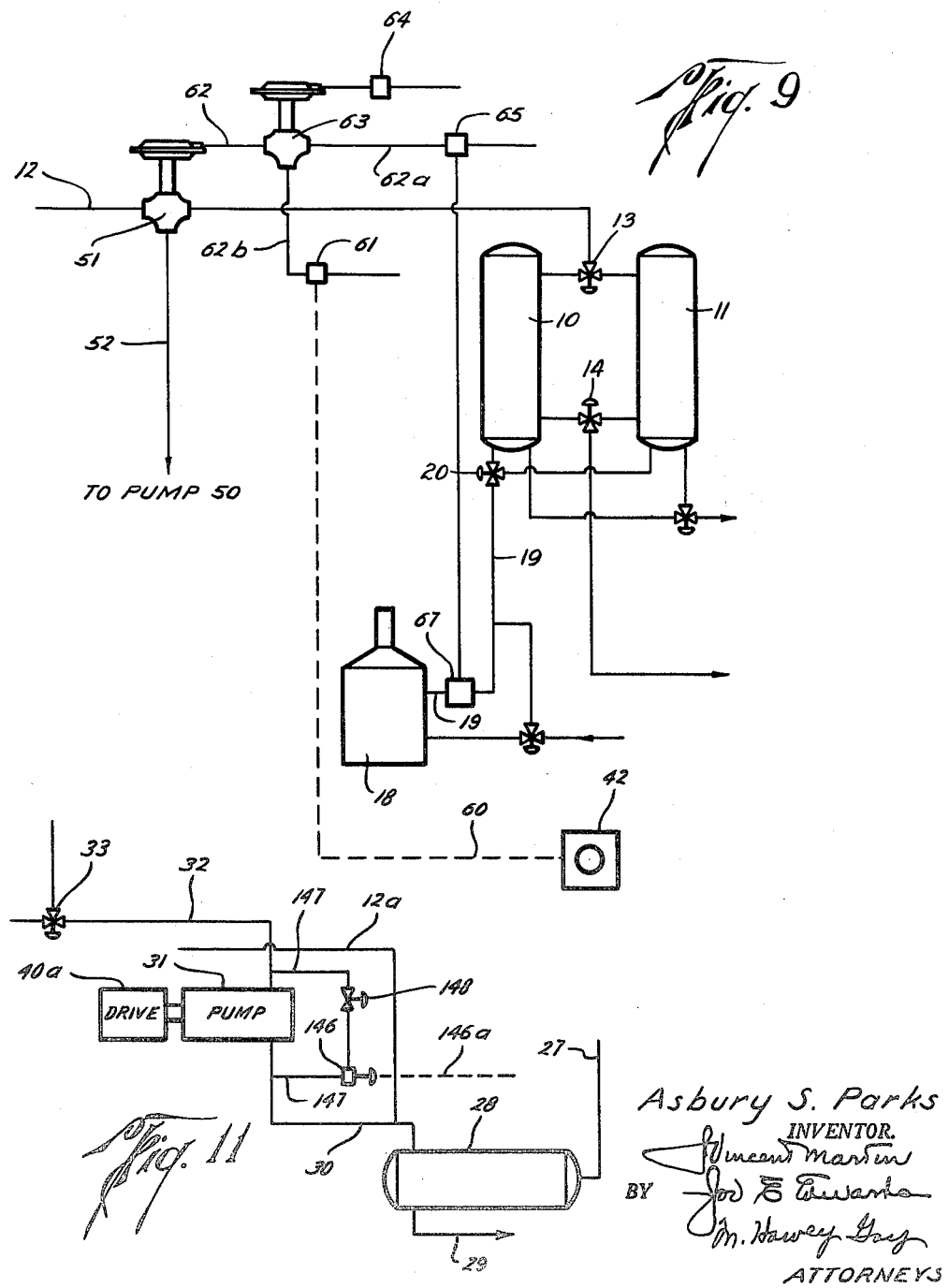

3,181,286
APPARATUS FOR RECOVERING HYDROCARBONS AND LIQUIDS FROM GAS STREAMS
Asbury S. Parks, Houston, Tex., assignor, by mesne assignments, to National Tank Company, Tulsa, Okla., a corporation of Nevada
Filed Nov. 5, 1958, Ser. No. 771,987
3 Claims. (Cl. 55—163)

This invention relates to new and useful improvements in apparatus for recovering hydrocarbons and liquids from gas streams.

There are in general commercial use processes for recovering hydrocarbons and removing water from natural gas streams and in these processes the objective is to extract the hydrocarbon fractions and the water vapor from the gas. The usual type of process employs multiple beds of adsorbent material with the cycle of operation being such that one or more beds are on an "adsorbing" cycle to adsorb fractions from the main gas stream while the other bed or beds are on the "regenerating" cycle; the regenerating cycle involves the passage of a heated regenerating gas through the bed or beds to extract the previously adsorbed fractions and to dry or regenerate said bed for the next succeeding cycle. Thus, each bed in the system is alternately on an adsorbing cycle during which period it becomes saturated and is then on a regenerating cycle during which period it is dried.

Actually, each complete cycle of operation to which each bed is subjected includes three separate or independent phases, first, the adsorbing cycle or saturating phase during which the main gas stream is directed through the bed to effect adsorption of the fractions, second, the heating phase of the regenerating cycle during which a heated regenerating gas is passed through the bed to vaporize and thereby extract the adsorbed fractions from said bed and third, the cooling phase of the regenerating cycle during which relatively cool gas is conducted through the bed to cool said bed and thereby prepare it for the next succeeding cycle of operation.

During the heating phase of each cycle, the stream of hot regeneration gas which flows from the bed is rich in the desirable liquid fractions and is subsequently cooled to condense said fractions and permit their recovery as liquids. This condensation step is, of course, of importance and one of the more efficient methods now in use is that of a separate or closed "regeneration gas circuit" which is substantially independent of the main gas stream, such method being clearly illustrated and described in the co-pending application of Willard M. Dow, Serial No. 667,440, filed June 24, 1957 which has now matured into Patent No. 2,880,818. In the closed regeneration gas circuit, the gas is pumped through a suitable heater, then through the bed of adsorbent material, then through a condenser or cooler from which the liquids are withdrawn after which the gas is returned to the pump for recycling within its circuit.

When the process is employed primarily for the extraction of hydrocarbon fractions, it is economically essential that the total elapsed time for each complete cycle of operation be minimized; to accomplish this, the regeneration cycle must be minimized so that the bed may be heated to vaporize and thereby remove the adsorbed fractions and then cooled to prepare it for the subsequent adsorbing cycle in the shortest possible time. By reducing the time required for regeneration, switch-over from one bed to another may occur more rapidly and a higher recovery of desirable fractions may be accomplished.

It is, therefore, one object of this invention to provide an improved apparatus for the removery of liquid fractions wherein the gas being processed is directed through beds of adsorbent material and also wherein the time required for the regeneration cycle to regenerate each bed is reduced to a minimum, whereby a maximum recovery of the desirable fractions is obtained.

As used herein the terms "liquid fractions," "liquid fractions of a gas stream" and "hydrocarbon fractions" are intended to mean those components which are present in vapor form in a gas stream and which may be separated from the other components of the stream and subsequently retained in a liquid state.

An important object is to provide an improved apparatus in which the rate of circulation of the hot regenerating gas stream is controlled to direct the maximum possible volume of regeneration gas through the adsorbent bed during the heating phase of the regeneration cycle, whereby maximum heat input into the bed is accomplished and the bed is heated in the shortest possible time; the rate of circulation of unheated regeneration gas during the cooling phase of the regeneration cycle also being controlled to direct the maximum possible volume of cool regenerating gas through said bed to thereby accomplish cooling of the bed in the shortest possible time, the control of the rate of circulation of the regeneration gas stream, during both heating and cooling phases of the regeneration cycle, resulting in an overall minimum regeneration cycle.

A further object is to provide an apparatus of the character described, wherein the rate of circulation of the heated regeneration gas during the heating phase of the regeneration cycle is related to the capacity of the heating means and also wherein the rate of circulation of the unheated regeneration gas is restricted only by the mechanical limitations of the apparatus; the process contemplating a proper control of the rate of circulation to obtain maximum efficiency while also maintaining a maximum cycling rate of the main gas stream being processed.

A further object of the invention is to provide an apparatus of the character described, which includes controlling the rate of circulation of the regeneration gas during the heating and cooling phases of each regeneration cycle, with said control either maintaining said rate constant during both the heating and cooling phase or varying the rate during cooling as compared to heating or controlling said rate in any desired manner in accordance with particular conditions.

A particular object is to provide an apparatus for recovering liquid fractions from a gas stream by passing said stream through a bed of adsorbent material, together with a regeneration gas circuit which is arranged to direct the regeneration gas through said bed to regenerate the same; said apparatus including means for controlling the rate of circulation of the regeneration gas during the heating and cooling phases of the cycle, with the control means being subject to wide variation and being operable by pressure differential at selected points in the system, by temperature variation in the heated gas or by any other selected variable which is present in the system.

As has been noted, the closed regeneration gas circuit which is, in effect, separate from the main gas stream involves a pump or compressor which moves the regeneration gas through its circuit and ordinarily, such pump is powered by a suitable prime mover, such as an internal combustion engine or electric motor. Not only are such prime movers relatively expensive but in some locations where gas is to be processed, they are impractical. The main gas stream being processed may be a high pressure natural gas stream having an excess of pressure available thus permitting the use of a part or all of the main stream flowing to drive the pump or compressor of the regeneration gas circuit.

It is, therefore, still another object of this invention to provide an improved apparatus, of the character described, wherein the pump or compressor which moves the regeneration gas through its circuit is powered by a portion of the main high pressure gas stream.

Still another object is to provide an improved pumping device wherein the pump and its driving motor are contained in a single chamber and wherein the pressure in said chamber is equalized with either the inlet or discharge of the pump and with either the inlet or discharge of the driving motor, whereby moving or rotating seals are not subjected to high pressure differential to make the unit particularly adaptable to operation by a high pressure gas stream.

A further object is to provide an improved pumping device which may be advantageously employed with an apparatus for processing high pressure gas streams; said device including a pump and a gas driven motor which is actuated by a portion or all of the gas stream, with said pump and motor being mounted within a single pressure chamber, the pressure of which is suitably equalized with the main gas stream pressure entering the unit and is also equalized with the suction of the pump and the discharge of the gas driven motor, whereby the pressure differential existing between the interiors of the pump and the drive motor on the one hand and the interior of the surrounding chamber on the other hand remain substantially unchanged, regardless of pressure fluctuations in the system.

Another object is to provide an improved pumping unit, of the character described, for pumping a regeneration gas through a circuit which includes beds of adsorbent material, said device lending itself to association with various controlling means which control the rate of circulation of the regeneration gas being pumped by said unit.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is a flow diagram of an apparatus for carrying out the improved process in accordance with this invention and showing the operation of the pumping unit which controls rate of circulation of the regeneration gas; the rate of pumping being controlled by an orifice plate and rate controller device;

FIGURE 2 is a partial flow diagram illustrating a modification of the control means which controls rate of circulation of the regenerating gas during the regeneration cycle;

FIGURE 3 is a view similar to FIGURE 2 but showing the control of the rate of circulation of the regeneration gas being accomplished in accordance with pressure drop across the pumping unit;

FIGURE 4 is a flow diagram of another form of apparatus for carrying out the process in which the pumping unit for the regeneration gas stream is powered by a portion of the main high pressure gas stream which is being processed;

FIGURE 5 is a view partly in section and partly in elevation of the splitter or dividing valve employed in the form of FIGURE 4;

FIGURE 6 is a partial flow diagram illustrating the orifice and rate controller apparatus applied to the pump unit of FIGURE 4;

FIGURE 7 is a view similar to FIGURE 6 illustrating the controlling means parts in FIGURE 2 applied to the pumping unit of FIGURE 4;

FIGURE 8 is a view similar to FIGURES 6 and 7 and illustrating the control means of FIGURE 3 applied to the pumping unit of FIGURE 4;

FIGURE 9 is a partial flow diagram of the apparatus of FIGURE 4 wherein the rate of circulation of the regeneration gas is controlled both by a rate controller type of means and by the temperature of the regeneration gas;

FIGURE 10 is a partial flow diagram of a modification of the control shown in FIGURE 1;

FIGURE 11 is a parial flow diagram of a rate control means where the pump is operated at a constant speed;

FIGURE 12 is a transverse sectional view of the pump unit illustrated schematically in FIGURE 4 which unit is adapted to be powered by a portion or all of the high pressure main gas stream;

FIGURE 13 is a longitudinal sectional view taken on the line 13—13 of FIGURE 12;

FIGURE 14 is a horizontal cross-sectional view taken on the line 14—14 of FIGURE 12 and FIGURE 15 is a graph or chart illustrating the heating and cooling phases of one regeneration cycle of the bed of adsorbent material.

In the drawings, FIGURE 1 illustrates an adsorption type apparatus and process for extracting hydrocarbon and other liquid fractions from a gas stream. Although the apparatus and process are subject to some variation, it is preferable to employ the apparatus and process disclosed in the copending application of Willard M. Dow, Serial No. 667,440, filed June 24, 1957 which has now matured into Patent No. 2,880,818. This type of apparatus and process employs the so-called closed regeneration gas circuit which is, in effect, isolated from the main gas stream and which is alternately heated and cooled, during each cycle; the regeneration gas stream is recycled through its own substantially independent system.

The apparatus includes a pair of adsorption vessels or towers 10 and 11 and each tower contains a bed of suitable adsorbing material or desiccant such as silica gel or activated charcoal. The flow of the main gas stream is directed through the bed of one tower while a regenerating gas is directed through the other tower; after each cycle of operation, the flows through the towers are switched so that the towers 10 and 11 are alternately on an adsorbing cycle and a regenerating cycle.

A main gas stream inlet 12 extends to a three-way valve 13 and from this valve flow is either through a line 10a or a line 11a to one or the other of the towers 10 or 11. Assuming tower 10 to be on an adsorbing cycle, with tower 11 being regenerated, valve 13 is in a position to direct flow from the main inlet line 12 through line 10a and into tower 10 whereby the gas stream is passed through the bed of adsorbent material within said tower. As is well known, the adsorbent material functions to adsorb the liquids including the desirable hydrocarbon fractions or constituents, and the gas stream discharges from the lower end of the tower 10 through a line 10b. From that point, a three-way valve 14 directs the gas stream through an outlet conductor 15, then through a heat exchanger 16 and finally outwardly through the main gas discharge conductor 17. The adsorbent material within the tower preferably has an adsorption affinity for the lighter hydrocarbons such as propane, butane and pentane; also water will be adsorbed so that the discharging gas stream is substantially dry.

With the tower 10 on the adsorbing cycle, the tower 11 is on the regeneration cycle and during this period a regeneration gas stream is directed through said tower 11. During the first portion of the regeneration cycle, hereinafter referred to as the heating phase of the cycle, the regeneration gas is heated and functions to vaporize or pick up the liquid fractions which had been adsorbed by the bed of adsorbent material on the preceding adsorption cycle. Thereafter, the liquid fractions which are picked up by the regeneration gas are condensed and removed from the unit as a liquid product. During the latter portion of the regeneration cycle, which will hereinafter be referred to as the cooling phase of the cycle, the unheated regeneration gas is directed through the tower to cool the bed and place it in condition for switchover to the next adsorbing cycle.

The regeneration gas stream flows through its own separate or closed circuit or system and such system includes a heater 18. A discharge line 19 extends from the heater to a three-way valve 20 and from said valve a line 20a extends to tower 10 with another line 21a extending to the tower 11. Assuming tower 11 to be on a regeneration cycle, the position of valve 20 directs the flow into tower 11 and through the bed of adsorption material therein. The regeneration gas stream discharges from the tower 11 through a conductor 22, past a three-way valve 23 and through a line 24 to a heat exchanger 25, the latter being illustrated as an atmospheric type. The heat exchanger cools the gas stream and encourages condensation of the liquid fractions which have been picked up by said stream in its passage through the bed in tower 11. From heat exchanger 25 the flow is through connecting pipe 26 and through the heat exchanger 16 where the regeneration gas stream is passed in heat exchange relationship with the discharging main gas stream so that further cooling of the regeneration gas stream occurs. From the heat exchanger 16 the regeneration gas flows through a conductor 27 into a liquid accumulator 28 wherein the condensed liquids are separated from the gas. The liquids are withdrawn from the accumulator through the line 29. The regeneration gas leaves the accumulator through a return line 30 which has connection with the suction side of a circulating pump 31. The discharge line 32 of said pump has connection with the inlet side of heater. A three-way valve 33 is mounted in line 32 and extending therefrom is a bypass conductor 34. It will be evident that when the valve 33 is in one position, the regeneration gas may be directed through line 32 to the heater whereas a different position of valve 33 will allow the regeneration gas to bypass the heater and flow directly into line 19 and then to the towers without passing through the heater. In order to equalize the pressure conditions in the regeneration gas circuit and those in the main gas line and also to properly condition the regeneration gas, an equalizing or breather line 12a extends from the connecting line 30 which is between the accumulator 28 and pump 31, and the main line 12. The equalizing line permits flow back and forth between the main line 12 and the regeneration gas circuit as is fully explained in said Dow Patent No. 2,880,818.

When tower 10 is on the adsorbing cycle and tower 11 is on a regeneration cycle, the flow of the gas streams is as above noted. When these cycles are complete, the valves 13, 14, 20 and 23 are actuated so that flow of the main gas stream from the inlet line 12 is through tower 11 while flow of the regeneration gas from line 19 is through the tower 10. In this case the main gas stream flows through tower 11 and is discharged through a line 11b which connects through valve 14 with the discharge conductor 15. Flow of regeneration gas is from line 19, past valve 20 and through inlet line 20a into the tower 10. After passing through the bed in tower 10, the regeneration gas stream flows through the conductor 22a which extends from tower 10 to the valve 23 and from this point the regeneration gas progressively passes through the condenser cooler 25, heat exchanger 16, liquid accumulator 28 and to pump 31 for recycling through the circuit.

Each complete regeneration cycle includes a heating phase and a cooling phase. During the first portion of the regeneration cycle, the regeneration gas is directed through the heater so that heated gas is passing through the bed of adsorption material in the particular tower which is on the regeneration cycle. This heated regeneration gas vaporizes the liquids which had been previously adsorbed and such liquids are removed as the regeneration gas stream is discharged from the tower and finally passes through the liquid accumulator 28. During the latter portion of the regeneration cycle, the bypass valve 33 is actuated so that unheated regeneration gas is directed through the bed in order to cool the bed in preparation for the next succeeding adsorbing cycle. By cooling the bed during the latter portion of the regeneration cycle an undue load is not placed upon the bed when the main gas stream is subsequently directed therethrough.

The complete regeneration cycle is illustrated in the chart, FIGURE 15. The horizontal base line 35 is representative of the time of the regeneration cycle. When the various switching valves are actuated to start a regeneration cycle, valve 33 is in a position which directs the regeneration gas through the heater and the start of the cycle is illustrated at point S on base line 35 in FIGURE 13. Heating of the circulated regeneration gas continues from point S to point A in the time period, which is the heating phase of the regeneration cycle. At point A, valve 33 is actuated so that thereafter the regeneration gas continues to circulate but bypasses the heater 18. Thus during the time period as indicated from point A to point B in FIGURE 13 the regeneration gas is circulated through the bed without any application of heat; this constitutes the cooling phase of the regeneration cycle which functions to cool the bed in preparation for the next succeeding adsorbing cycle. In FIGURE 13 the curve 36 represents the rate at which liquid is produced during one complete regeneration cycle.

The rate of circulation or the volume of regeneration gas which is directed through the bed during the heating phase will have an effect on the time during which regeneration or drying of the bed may occur; also, the rate of circulation or the volume of cool regeneration gas which is directed through the bed during the cooling phase of the regeneration cycle will have an effect on the overall time required to adequately cool the bed in preparation for the subsequent adsorbing cycle. Of course, the rate of circulation of regeneration gas during the heating phase is limited by the capacity of the heater 18 but the rate of circulation of the cool regeneration gas, which bypasses the heater is limited only by the mechanical limitations of the apparatus. Therefore, in order to obtain maximum efficiency in the regeneration cycle and to hold said cycle to a minimum time period, it is desirable to control the rate of circulation of the regeneration gas to the maximum and the present invention is concerned with such control.

Referring again to FIGURE 1, the pump 31 may be any suitable pumping unit and is illustrated as being powered by a suitable drive unit 40 which may be an internal combustion engine, an electric motor or any other drive unit. Since the speed of operation of the pump 31 controls the rate of circulation through the regeneration gas circuit, it will be evident that a control of the driving unit 40 will result in a control of the rate of circulation of said regeneration gas.

Under certain conditions it may be desirable to maintain the rate of circulation substantially constant regardless of whether the cycle is in the heating phase or the cooling phase and for this purpose a simple type of control as illustrated in FIGURE 1 may be employed. This control includes an orifice plate 41 which is of predetermined size to develop a predetermined or known pressure drop across said plate. A rate control instrument 42 of standard construction and available on the open market is connected through lines 43 and 44 with the conductor 30 on opposite sides of the orifice plate 41. The instrument 42 is thus responsive to the pressure differential across the orifice plate and said instrument is in turn connected by a suitable means indicated by the dotted line 45 with the driving unit 40 of the pump.

With this control arrangement, the operation is obvious. By selecting the proper size orifice plate 41, the predetermined pressure drop which occurs when the desired rate of regeneration gas is being circulated is preset. This pressure drop acting through the rate controller 42 will control the speed of operation of the drive unit 40, whereby the proper volume of regeneration gas is constantly circulated through the system. If the rate of circulation increases or decreases, such increase or decrease is immediately sensed by controller 42 due to a change in the predetermined pressure drop across orifice plate 41 and the speed of the drive unit is either increased or decreased to bring the rate of circulation back to the desired point. Obviously any standard type of control means for changing the speed of the drive unit 40 by means of the rate controller instrument 42 may be employed and it is not believed necessary to specifically illustrate said means herein.

The heater 18 which, during the heating phase of the regeneration cycle, is heating the regeneration gas has a predetermined maximum capacity. This maximum capacity of the heater will limit the rate of circulation or the volume of regeneration gas which is passed through the heater during said heating phase. However, when the bypass valve 33 is actuated at the end of the heating phase of the cycle, the gas bypasses the heater and then the only restriction on the rate of circulation of the gas is the limitations of the mechanical apparatus. For this reason it is possible to increase the rate of circulation or the volume of gas flowing through the regeneration circuit during the cooling phase of the regeneration cycle; as a matter of fact, this is highly desirable since an increase in the volume of cool gas being circulated will cool the bed more rapidly and thereby shorten the overall period required for regeneration.

In FIGURE 2 a control means is illustrated for accomplishing a circulation of the regeneration gas at one rate during the heating phase of the cycle and then automatically changing the rate of circulation during the cooling phase of said cycle. As shown, this control means includes the orifice plate 41 and the rate controller 42 which has connection with line 30 through the connections 43 and 44. As explained, the rate controller 42 will control the operation of the drive unit 40 of the pump or air compressor 31. During the heating phase of the regeneration cycle, flow through the line 30 will be through the orifice plate 41 and the controller 42 will maintain a constant rate of circulation of the regeneration gas. This rate will, of course, be predetermined in accordance with the capacity of the heater 18 so that a maximum volume of heated gas may be directed through the bed within the particular tower which is on regeneration. Through this control, maximum heating efficiency will be produced in the shortest period of time within the limits of the capacity of the heater.

When the heating phase of the regeneration cycle is completed, which is at a time that the valve 33 is actuated to direct the regeneration gas through the bypass line 34, the same signal which operates the valve 33 may operate a valve 46 which is connected in a bypass 47 spanning the orifice plate 41. When valve 46 opens, a portion of the flow through line 30 may pass around the orifice plate 41 through the bypass 47. The volume of the bypassing flow may be set by a suitable choke 48 connected in the bypass. Also if desired, the valve 46 may be of the type which has an adjustable maximum opening so that it may also function to control the volume.

As a portion of the flow in line 30 bypasses the orifice plate 41, the pressure drop across said orifice plate will be changed and such change will be directly related to the adjustment of the choke 48. This change in pressure drop will be sensed by the controller 42 which acts upon the drive unit 40 to change the speed of pump 31 and thereby effect a change in the volume of gas being moved through the regeneration gas circuit. By properly adjusting the choke 48 and controlling the volume of gas bypassing the orifice plate, it is evident that the rate of circulation which occurs during the cooling phase of the cycle may be accurately controlled. This rate may be set at the maximum within the mechanical limitations of the equipment so that a large volume of cool gas may be directed through the tower during the cooling phase to shorten the overall time period for regeneration. Of course, at the end of the regeneration cycle, valve 46 would close and control during the next succeeding heating phase of the cycle would again be controlled by pressure drop across the orifice 41.

Although the control means shown in FIGURES 1 and 2 have been found satisfactory, other means of controlling the operation of the pump or compressor to thereby control rate of circulation of the regeneration gas may be employed. In FIGURE 3, another type of control is illustrated. As has been noted, the regeneration gas is directed through the heater 18 during the heating phase of the regeneration cycle, but during the cooling phase of said cycle the gas bypasses the heater and flows directly to the towers. When the heater is connected in the circuit, a particular pressure differential across the pump or compressor 31 will be present. However, when valve 33 operates and the heater 18 is bypassed, this will result in a change in the pressure differential occurring across pump 31. These variations in pressure differential, one occurring during the heating phase and the other occurring during the cooling phase, may be employed to operate the rate controller instrument 42 to control the operation of the drive unit 40 for said pump.

As shown in FIGURE 3, a connection 43a extends from pump inlet line 30 to the instrument 42 while a second connection 44a connects the pump discharge line 32 with said instrument. The instrument 42 is thus connected to sense the pressure differential which occurs across the pump. As noted, one pressure differential will occur when the regeneration gas is being directed through the heater while another pressure differential is present when the gas bypasses the heater. Therefore, during the heating phase controller 42 controls the operation of the pump 31 in accordance with pressure differential present when the heater is connected in the circuit. Upon bypass valve 33 being actuated to effect a bypass of gas around the heater, the change in pressure differential which occurs across the inlet and discharge of the pump is immediately sensed by controller 42 which adjusts the drive unit 40 to change the speed of the pump and increase the rate of circulation.

In all instances it is desirable that the control means set the rate of circulation of the regeneration gas so that the maximum volume of gas which can be properly handled by the heater is passed through said heater. During the cooling phase of the regeneration cycle, it is desirable to increase the rate of circulation or volume so that a maximum quantity of cool gas may be passed through the tower bed in a minimum time. With the control being automatic, it is evident that maximum efficiency will be obtained and regeneration may be accomplished in a minimum length of time. This means shorter cycling periods and results in increasing the recovery of desirable fractions from the main gas stream.

In FIGURES 1 to 3 the pump or compressor 31, which circulates the regeneration gas through its circuit, is illustrated as being driven by the drive unit or prime mover 40. However, such a prime mover is relatively expensive and in certain locations where natural gas is to be processed, the use of such prime movers as an internal combustion engine or an electric motor becomes impractical. As is well known, the type of natural gas stream from which hydrocarbon fractions are recovered by processes of the character herein disclosed, are usually under high pressure and, therefore, an excess pressure is available for operating a unit such as the pump or compressor 31. In FIGURE 4 is shown an arrangement wherein a portion of the flow from the main gas line 12 is utilized to actuate a pump or compressor 50. The particular pump or compressor 50 is, as will be explained, of special design but any suitable pumping unit could be substituted therefor.

The driving unit of the pump 50 is gas powered and the gas for operating the same is conducted from the main gas inlet line 12 through a splitter valve 51 and line 52 to the driving unit. After passing through the driving unit, the gas is discharged through outlet line 53 which may have connection with the equalizing line 12a so as to be returned to the main gas line 12.

The splitter valve 51 is arranged to be adjusted so that more or less gas is conducted to the driving unit of the pump or compressor 50 and by changing the rate of gas flow through said driving unit, the rate of circulation of regeneration gas being pumped through the regeneration circuit is varied. The control of the splitter valve 51 may be automatically accomplished so that the pump 50 will pump the maximum volume of regeneration gas, within the limits of the heater capacity, during the heating phase of the regeneration cycle. During the cooling phase of said regeneration cycle, the splitter valve is adjusted to change the speed of operation of the pump or compressor 50 so that maximum volume of cool regeneration gas may be circulated through the system.

The valve 51 is subject to some variation and may be a simple globe type valve having dual openings in the body with line 52 connected to line 12 upstream of the valve. Also, although it has been found satisfactory to locate the splitter valve 51 upstream of the towers 10 and 11, said valve could be located downstream of the heat exchanger 16 in the discharge line 17 so that the pump would be powered by all or a portion of the gas passing through said discharge line.

One type of splitter valve which has been found particularly suitable for the purpose is illustrated in FIGURE 5 and includes a main body 54 formed with suitable connections to permit its mounting within the main inlet line 12 and to connect the conductor 52 therewith. A cylindrical opening 55 is formed within the central portion of the valve body by suitable partitions 56 and 57 and a valve member 58 is movable axially with respect to the cylindrical opening. The valve member is carried by a stem 59 which has its upper end connected with a diaphragm 59a and a coil spring 59b which surrounds the stem exerts its pressure to constantly urge the valve member to its open or dotted line position as shown in FIGURE 5.

When sufficient pressure is introduced through a control line 62 and acts against the upper surface of diaphragm 59a, valve member 58 is moved to the position shown in full lines in FIGURE 5 in which position flow through the cylindrical opening 55 is restricted. In such position a portion of the main gas stream is directed downwardly through the conductor 52 to the drive unit of the pump or compressor 50. When the valve member 58 is moved upwardly to its upper position as shown in dotted lines, substantially all of the main gas flow may pass through the opening 55 and flow through line 12 to the towers. At such time very little gas is directed through conductor 52. By controlling the diameter of the valve element 58 with relationship to the diameter of the opening 55, the desired volume of gas may be split off from the main stream and directed to the driving unit of the compressor. The position of the valve element 58 is, of course, controlled by a pilot pressure which is acting against the upper side of diaphragm 59a. The pilot pressure is conducted to the diaphragm through the line 62 in which a suitable pilot pressure control (not shown) is mounted.

The position of the splitter valve 51 to control the operation of the pump or compressor 50 may be accomplished in any desired manner. In FIGURE 6, this control is illustrated as being accomplished by the orifice plate 41 and rate controller instrument 42. The instrument 42 has connection as indicated by the line 60 with a pilot control 61. As has been described with reference to the control means of FIGURE 1, the controller 42 will position the valve element 58 in accordance with the predetermined pressure drop across the orifice plate. Since this pressure drop is preselected or predetermined, the rate of circulation of the regeneration gas through its circuit will be maintained substantially constant regardless of whether the regeneration gas is passing through the heater (heating phase) or is bypassing the heater (cooling phase).

It if is not desired to maintain the rate of circulation of the regeneration gas constant, then the control means illustrated in FIGURE 2 would be applied in the manner shown in FIGURE 7. In this figure the orifice plate 41 and rate controller are employed with said rate controller actuating the splitter valve through a suitable connecting means 60. The bypass line 47 having valve 46 and choke 48 mounted therein, extends around the orifice plate. As has been explained, during the heating phase the position of the splitter valve is controlled by the pressure drop across the orifice plate 41. However, at the time that the heating phase is complete, valve 46 operates to bypass a portion of flow around said plate to change the pressure differential on opposite sides of the orifice. This results in the controls adjusting the position of the splitter valve which changes the operation of the pump or compressor 50 and thereby changes the rate of circulation of the regeneration gas. Where the control means of FIGURES 6 and 7 are applied to the system, it will be evident that the rate of circulation of the regeneration gas stream is dependent upon the volume of gas which is split off and diverted through the driving unit of the pump 50.

In FIGURE 8, the control means of FIGURE 3 is shown applied to the pump or compressor 50. In this case the rate controller 42 has connection through line 43b with the suction or inlet side of pump 50 and also has connection through line 44b with the discharge or outlet side of said pump. The controller 42 is thus responsive to the pressure differential across the suction and discharge sides of said pump and through its connection 60 with the control 61, the splitter valve 51 is actuated. Thus the operation of the pump or compressor 50 is actually controlled in accordance with the pressure differential across said pump. As has been noted, one pressure differential will occur across the unit when the regeneration gas is directed through the heater whereas another pressure differential obtains when the heater is bypassed. These changes in pressure differential are utilized to change the position of the valve element 58 of valve 51 to vary the operation of the pump or compressor 50 and thereby change the rate of circulation of the regeneration gas within its system.

In some instances, it may be desirable to control the position of the splitter valve 51 during the heating phase of the regeneration cycle in accordance with the temperature of the gas discharging from the heater and to control the position of said valve by some other means during the cooling phase of said cycle. Such an ararngement is schematically illustrated in FIGURE 9. In this case the pilot supply line 62 which directs pressure to the diaphragm 59a has a three-way valve 63 connected therein. This valve may be diaphragm operated and is controlled by a controller 64 which is actuated at the same time that the heating phase and the cooling phase of the regeneration cycle start. At pilot line 62a extends from a controller 65 which has connection as indicated by the line 66 with a temperature responsive element 67 mounted in the discharge conductor 19 which extends from the heater 18. The pilot line 62b extends from the controller 61 which has connection through the line 60 with the rate controller 42. The position of valve 63 which, as has been stated, is actuated at the start of the heating phase and at the start of the cooling phase, determines whether the controller 65, actuated by the temperature responsive element 67, or the controller 61, actuated by the rate controller 42, will position the splitter valve 51.

In operation, assuming the regeneration cycle to have started with the regeneration gas being directed through the heater 18, the three-way valve 63 is positioned so that controller 65 is controlling the position of the splitter valve 51. Since controller 65 is responsive to temperature variations through the temperature responsive element 67, it is obvious that if the output temperature of the heater rises above the set value, controller 65 acts on the splitter valve to increase the rate of flow through conductor 52 to increase the speed of the compressor 50. Similarly, if the temperature falls below the set value, the temperature responsive element 67 senses this change and acts through controller 65 to readjust the splitter valve and decrease flow through conductor 52 to vary the operation of the pump or compressor 50. Therefore, during the heating phase of the regeneration cycle the splitter valve is controlled in accordance with the temperature of the gas discharging from the heater.

When the heating phase ends, controller 64 operates the three-way valve 63 and this places the controller 61 into operation in controlling the position of the splitter valve 51. As has been explained, the controller 61 is actuated by the rate controller 42 which is responsive either to pressure drop across the orifice plate 41 (FIGURES 6 and 7) or to pressure differential across the pump or compressor 50 (FIGURE 8). It is thus obvious that during the cooling phase of the regeneration cycle, control of the operation of the pump or compressor 50 is by pressure differential or some means other than temperature.

The particular system of control wherein the rate of circulation during the heating phase is controlled in accordance with temperature at the discharge of the heater and rate of circulation during the cooling phase is controlled by some other means is also applicable to the form of the invention shown in FIGURE 1. In FIGURE 1 the pump or compressor 31 is actuated by a prime mover or drive unit 40 and if desired, the controllers 61 and 65 may be utilized in combination with the three-way valve 63 to control actuation of said drive unit 40.

There are various ways in which the control of the rate of circulation may be carried out and in FIGURES 10 and 11 additional modifications are shown. The control system shown in FIGURE 10 is substantially the same as that illustrated in FIGURE 1 wherein a pressure differential across a fixed orifice 41 is sensed by the controller 42 with said controller in turn controlling the speed of the drive unit 40. Where the fixed or predetermined orifice 41 is employed, the rate of circulation would be maintained substantially constant during both the heating and cooling phases. If it is desired to change the rate of circulation during cooling as compared to the rate of circulation during heating, it is only necessary to provide an additional control 142 which acts upon the controller 42. The control unit 142 would be actuated through a control line 143 at the same time that the bypass valve 33 is actuated.

In operation the control system shown in FIGURE 10 would maitnain the rate of circulation at a predetermined point during the heating phase of the regeneration cycle by sensing the pressure differential across the orifice 41. However, when the bypass valve 33 is operated at the start of the cooling phase of the cycle, the auxiliary control 142 is actuated at the same time. This control varies the controller 42 so that said controller may increase the speed of the drive unit 40 even though the controller is still actuated by the same pressure differential. Therefore, during the cooling phase the rate of circulation of the regeneration gas is increased, as compared to the rate of circulation during the heating phase so that a greater volume of gas is moved through the regeneration system during said cooling phase. Of course, upon completion of the cooling phase of the regeneration cycle, bypass valve 33 is closed and simultaneously the auxiliary control 142 is actuated to return the controller 42 to its initial operating position whereby upon the next subsequent regeneration cycle the rate of circulation is again reduced during the heating phase.

In FIGURE 11 a control system is shown in which a constant drive unit 40a, such as an electric motor, could be employed to operate the regeneration gas pump. In order to vary the rate of circulation during the heating and cooling phases of the cycle, a bypass line 147 connects with the suction and discharge sides of the pump. An adjustable choke 148 is connected in the line as is a control valve 146. The opening and closing of the control valve 146 is actuated through a control line 146a and is operated at the same time that the bypass valve 33 is actuated.

In the operation of the control system of FIGURE 11, valve 146 is open to allow flow through bypass line 147 at the same time that the valve 33 is in a position directing the regeneration gas to the heater; this is during the heating phase of the regeneration cycle. At this time a portion of the total volume of regeneration gas being handled by the pump 31, which is operated at a constant speed by the drive 40a, is recirculated around the bypass line 147. Therefore, the total volume of regeneration gas being handled by the pump is not circulated through the regeneration circuit during the heating phase of the regeneration cycle. The particular volume of gas recirculating in the bypass line 147 is controlled by properly adjusting the choke 148.

When the valve 33 is operated to direct the regeneration gas around the heater which is during the cooling phase of the cycle, valve 146 is also actuated and moved to a closed position to shut off flow through the bypass line 147. Thus, the entire volume of regeneration gas being handled by the constant speed pump is directed through the regeneration circuit during the cooling phase of the cycle. This increase in the rate of circulation is limited only by the mechanical limitations of the equipment connected in the regeneration circuit. The system of FIGURE 11 permits a control of the rate of circulation to a preselected value during the heating phase and then an increase to a different or higher value during the cooling phase without the necessity of changing the speed of the drive unit 40a. The system is therefore applicable where it is desired to employ a constant speed drive.

The pump or compressor 50 shown in FIGURES 4 to 9 may be any suitable gas driven pump or compressor. However, the requirement for a closed regeneration gas circuit is such that a relatively large volume of gas is used with a small increase in pressure through the pump. The gas may be at a relatively high pressure, possibly in the order of several thousand pounds, and the compressor may only raise this pressure from 10 to 50 pounds. The use of a standard reciprocating compressor is, because of its size and expense, not too practical particularly when it is to be operated at high pressure. The rotary type of compressors, either a vane type or one employing multiple lobe rotors, such as a Roots compressor, are more desirable since they have a high volume capacity for small compression ratios. However, the standard rotary compressor is not ordinarily built for high static pressure service; further the compressor employs a rotary shaft and sealing around such shaft presents a considerable sealing problem under high pressure differentials.

For the particular purpose of the present invention, the compressor combination apparatus illustrated in FIGURES 12 to 14 provides an arrangement which makes possible the use of a standard rotary compressor and a standard drive unit for pumping the regeneration gas. This apparatus includes an outer cylindrical casing 70 having one end closed by end plate 71 with its opposite end closed by a removable end plate 72; the interior of the casing forms a pump chamber. A rotary compressor unit A, which functions as a pump, is adapted to be connected with a suitable gas driven unit B, which may be similar in construction to the unit A and which functions as a motor or driving means. The respective shafts of the units A and B are connected together by a suitable drive coupling or gear box 73. If a gear box is used, the proper speed ratio between the drive unit and the pump unit may be obtained.

The units A and B are connected together by longitudinal flat side bars or plates 74 and 75, which bars are secured to the units by suitable fastening screws 76. Prior to the attachment of the end plate 72, the units A and B, being connected together by the side bars, may be inserted into the outer casing 70 and may be properly supported therein by upstanding supporting ribs 77 which are secured to the inner wall of the bottom of the casing 70 (FIGURE 13). Substantial axial alignment of the unitary assembly within the casing may be accomplished by the provision of fixed aligning members 78 (FIGURE 12) and longitudinal position of said assembly is controlled by stop lugs 79 secured to the inner surface of the end plate 71. When the assembly is in position in the casing, the inlet side of the compressor A communicates with an opening 80 in the supporting bar 74 while the inlet of the drive unit B is in communication with a similar opening 81 also in the side bar 74. Openings 82 and 83 in the other side bar 75 communicate with the discharge side of the compressor A and drive unit B respectively.

The flow line 30 which extends from the liquid accumulator 28 to the suction side of the pump is connected within an opening 84 formed in the wall of the casing 70 so that the regeneration gas being pumped may enter the interior of said casing. When the pump unit A is operated, the regeneration gas passes through the pump and is discharged therefrom through the opening 82 and then through a sealing assembly generally indicated at C which has connection with the line 32.

The gas which is split off from the main stream is directed to the inlet of the drive unit B through a sealing assembly D and then passes outwardly from the discharge of the unit B through a suitable coupling 85 which is secured in the wall of the casing 70. As will be hereinafter explained, pressures are so equalized with respect to the apparatus 50 that it is only necessary to seal the inlet side of the drive unit B and the discharge side of the pump unit A and for this purpose identical sealing means may be provided. These identical sealing means are indicated as C for the discharge side of the pump unit A and as D for the inlet side of the drive unit B.

As shown, each sealing assembly comprises a tubular, union-type nozzle 86 which is welded within an opening in the casing 70. A sealing collar 87 is located within the bore of the nozzle and has a slight clearance relative to the bore. The collar has its inner end adapted to abut the outer surface of the adjacent side bar (either 74 or 75) and said collar surrounds the inlet opening 81 of the drive unit or the discharge opening 32 of the pump unit as the case may be; by reason of the slight clearance between the collar and bore of the nozzle, the inner end of the collar may align itself with the flat surface of the side plate. A suitable O-ring 88 is mounted in a groove in the inner end of the collar 87 and when the collar is moved into tight engagement with the outer surface f the side bar, an effective seal is made.

For moving the collar into tight sealing engagement with the surface of the side bar, a plurality of screws 89 are threaded through an inwardly extending flange 90 formed within the bore of the nozzle 86; it is evident that upon tightening of these screws, the inner surface of the collar, in which the O-ring 88 is mounted, is urged into tight engagement with the bar. For sealing between the outer periphery of the collar 87 and the bore of the nozzle the outer surface of the collar is grooved to receive an O-ring 91 and thus an effective seal against high pressure leakage is effected. The outer surface of the nozzle is provided with an O-ring 92 which co-acts with the coupling (not shown) by which the line 52 is connected to the casing.

The collar 87 may be retracted from its sealing position by a plurality of retracting screws 93 which extend through the flange 90 of the nozzle 86. The screws 89 are loosened and then by rotating the screws 93, retraction of the collar from sealing position may be effected.

The sealing assemblies C and D provide a simple and effective self-aligning means for effecting a high pressure seal with the units A and B after such units have been positioned within the casing 70. Actually the units A and B are first positioned and then the sealing assemblies are moved into proper engagement with the said bars. As will be explained, there is no necessity for a high pressure seal on the discharge side of the drive unit but for effecting a closure, a union-type nozzle 94 is welded through an opening in the casing and a sealing sleeve 95 is confined between the outer surface of the side bar 75 and an internal shoulder 96 formed within the nozzle. The inner end of the sleeve 95 is flat and abuts the flat surface of the side bar while the outer end of the sleeve as well as the shoulder 96 may be arcuate or curved; this arrangement permits proper contact between the sleeve and shoulder even though the sleeve may be out of true axial alignment with the nozzle.

By observing FIGURE 4, it will be seen that the flow conductor 30 extending from the liquid accumulator 28 has connection with the casing 70 at substantially its central portion at the opening 84. Line 52, which extends from the splitter valve 51, connects to the inlet side of the drive unit B at sealing assembly D while return line 53 extends from the discharge side of said drive unit at nozzle 94. The conductor 32 has connection through the sealing assembly C with the discharge side of the pump unit A and extends to the heater. It is pointed out that the pressure in the line 30 which, of course, will be the pressure within the interior of the casing 70 is equalized through the line 12a with the discharge side, line 53, of the drive unit. Thus the pressure within chamber 70 is substantially the same as the pressure at the discharge side of drive unit B and there is no sealing problem at the discharge side of said unit. The inlet side of the pump unit A is within the interior of the casing and, in effect, the interior of the casing forms a chamber from which gas flows into the pump unit. Because of the equalization of pressures within line 30, within the interior of the casing 70 and also within line 53, the only seals which must be made are those at the inlet side of the drive unit and the discharge side of the pump unit. These seals are accomplished by the assemblies C and D which have been found satisfactory in sealing under the high pressures to which they may be subjected. Sealing at these points effectively prevents any leakage between the regenerator and power gas streams.

As has been noted, the standard units A and B are designed primarily for low static pressures and present shaft sealing problems when subjected to high pressure differentials. However, in the present instance where the pressure within chamber 70 is equalized with the inlet of the compressor unit A and the outlet of the drive unit B, there is a relatively small differential between the area exteriorly of the units and the area interiorly of the units. Under operating conditions, the pressure within the units A and B is greater than the pressure exteriorly thereof within the chamber so that the pressure differential is in the direction in which the shaft seals were designed to operate.

The pump or compressor unit shown in FIGURES 12 to 14 is relatively inexpensive and involves a minimum of sealing problems. It is, therefore, particularly adaptable for the purpose in pumping a regeneration gas within the so-called closed regeneration circuit.

The foregoing disclosure and description of the invention is illustrative and explanatory thereof and various changes in the size, shape and materials, as well as in the details of the illustrated construction, may be made within the scope of the appended claims without departing from the spirit of the invention.

What I claim is:

1. An apparatus for recovering liquid fractions from a main gas stream including, a vessel containing a bed of adsorbent material therein, means for directing the main gas stream through the bed whereby liquid fractions are extracted from gas stream, a regeneration gas circuit including a heater, a bypass around the heater, the adsorbent material bed, a condenser and a pumping device for circulating regeneration gas through said circuit, said pumping device including an outer casing forming a chamber, a compressor unit within said chamber having its inlet in communication with the chamber and having its outlet sealed against communication with the chamber whereby regeneration gas entering the chamber is pumped therefrom through the compressor discharge, a driving unit connected with said compressor unit and also within the chamber and having its inlet sealed against communication with the chamber, means equalizing the pressure in the chamber with the pressure in the regeneration circuit and the pressure in the driving unit outlet, and means for conducting a power gas to the inlet of said driving unit to operate the compressor unit and thereby control the rate of circulation of the regeneration gas in accordance with the volume of power gas directed through the driving unit.

2. An apparatus as set forth in claim 1, wherein the power gas is gas which is diverted from the main gas stream.

3. An apparatus for recovering liquid fractions from a main gas stream including, a vessel containing a bed of adsorbent material therein, means for directing the main gas stream through the bed whereby liquid fractions are extracted from said gas stream, a regeneration gas circuit including a heater, a bypass around the heater, the adsorbent material bed, a condenser and a pumping device for circulating regeneration gas through said circuit, said pumping device including an outer casing forming a chamber, a compressor unit within said chamber having its inlet in communication with the chamber and having its outlet sealed against communication with the chamber whereby regeneration gas entering the chamber is pumped therefrom through the compressor discharge, a driving unit connected with said compressor unit and also within the chamber and having its inlet sealed against communication with the chamber, means equalizing the pressure in the chamber with the pressure in the regeneration circuit and the pressure in the driving unit outlet, means for conducting a power gas to the inlet of said driving unit to operate the compressor unit and thereby control the rate of circulation of the regeneration gas in accordance with the volume of power gas directed through the driving unit, said power gas for the driving unit consisting of gas which is diverted from the main gas stream, and means responsive to conditions in the regeneration circuit for controlling the volume of gas which is diverted from the main stream to said driving unit to thereby control the rate of circulation of the regeneration gas stream within its circuit.

References Cited by the Examiner

UNITED STATES PATENTS

| | | | |
|---|---|---|---|
| 2,535,902 | 12/50 | Dailey | 55—33 |
| 2,588,296 | 3/52 | Russell | 55—62 X |
| 2,592,940 | 4/52 | Monoyer | 103—51 |
| 2,629,460 | 2/53 | Maki | 55—33 |
| 2,665,769 | 1/54 | Walker et al. | 55—21 |
| 2,679,541 | 5/54 | Berg | 55—61 X |
| 2,777,534 | 1/57 | McDonald | 55—163 |
| 2,841,087 | 7/58 | MacMeekin et al. | 103—108 X |
| 2,880,818 | 4/59 | Dow | 55—62 |

GEORGE D. MITCHELL, *Primary Examiner.*

WALTER BERLOWITZ, WESLEY C. COLE, HERBERT L. MARTIN, HARRY B. THORNTON,
*Examiners.*